Dec. 23, 1958 R. L. McCOY ET AL 2,865,982
SHIELDING FOR ELECTRICAL TRANSMISSION INSTALLATIONS
HAVING TWO CONDUCTORS PER PHASE
Filed June 6, 1957

Inventors,
Robert L. McCoy,
Joseph Kaminski, Jr.
by Gilbert P. Tarlton
Their Attorney.

2,865,982

SHIELDING FOR ELECTRICAL TRANSMISSION INSTALLATIONS HAVING TWO CONDUCTORS PER PHASE

Robert L. McCoy, Ellicott City, and Joseph Kaminski, Jr., Baltimore, Md., assignors to General Electric Company, a corporation of New York Application June 6, 1957, Serial No. 664,064

4 Claims. (Cl. 174—141)

This invention relates to shields for electrical transmission line installations which have two conductors for each phase of electrical energy.

It is an object of this invention to provide shielding means for electrical transmission line installations which have two spaced electrical conductors for each phase of electrical energy.

In one form of our invention a pair of conductors are individually pivotally connected to a string of electrical insulators in spaced relationship. A shield is provided for the clamp and connecting hardware of each conductor. Each shield is completely independent of the other so each shield can move simultaneously with its conductor to always provide corona protection for the clamp and connecting hardware of the conductor. The shields can be installed and removed with hot line tools, and the shields are made interchangeable.

The features of our invention which we believe to be novel are set forth with particularity in the appended claims. Our invention itself, however, both as to its organization and method of operation, together with further objects and advantages thereof, may best be understood by reference to the following description taken in connection with the accompanying drawing in which:

Figures 1, 2:
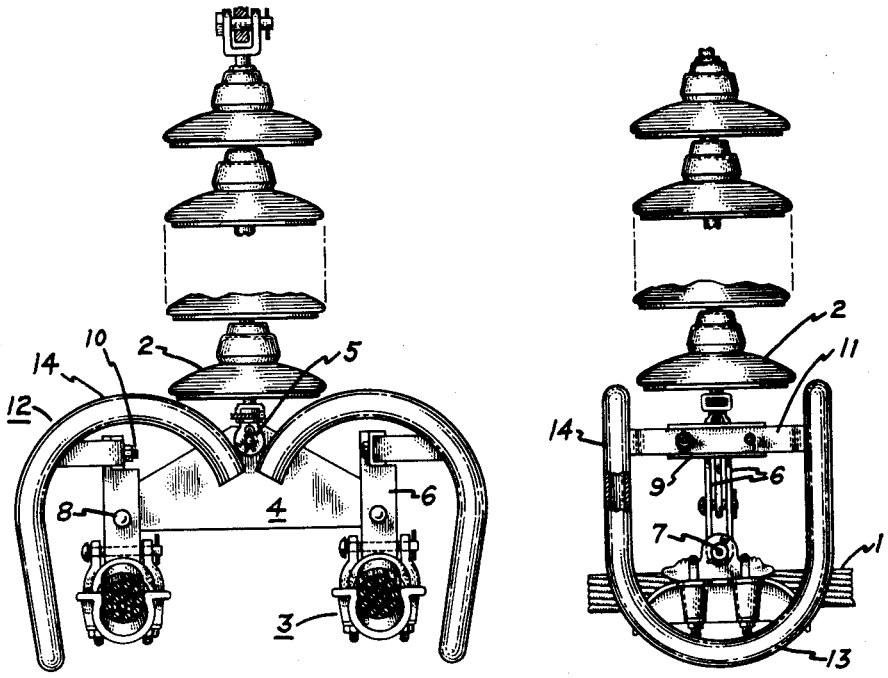
Fig. 1 is a front elevation view of one form of our invention.
Fig. 2 is a right-hand side elevation view of the apparatus of Fig. 1.
Figures 3, 4:
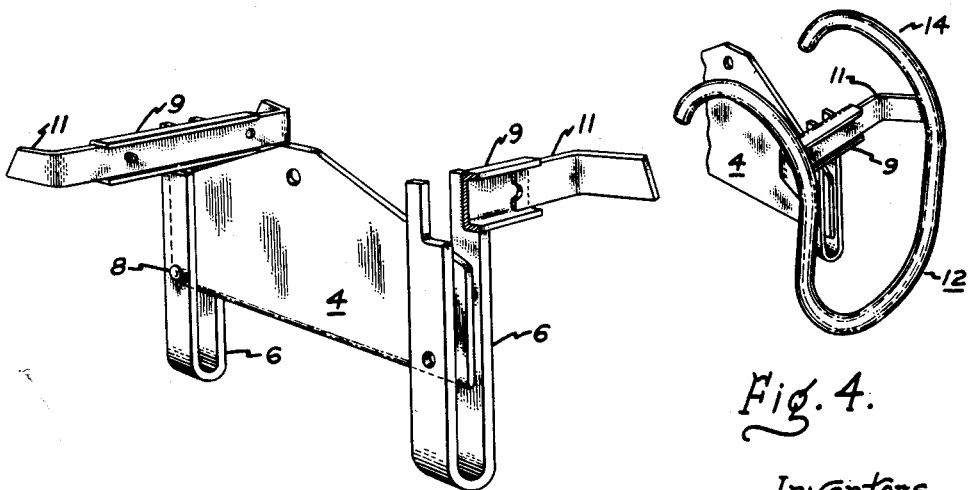
Fig. 3 is an enlarged perspective view of the yoke element and shield and conductor clamp support means.
Fig. 4 is a perspective view of one of the shields.

Shown in the drawing is a high voltage electrical transmission line installation comprising a pair of generally parallel and spaced electrical conductors 1 which are supported by a string of electrical insulators 2. However, it will be understood that more than one string of insulators can be used to support the conductors 1.

The illustrated installation is of the suspension type. In suspension type transmission line installations the upper end of the string 2 would be pivotally connected to the crossarm of a wooden line pole or metallic tower structure or other equivalent support means.

Each of the conductors is seated in and clamped in a saddle-type suspension clamp 3. Each of the clamps 3 are independently pivotally connected to a yoke element 4 which in turn is pivotally connected to the lower end of the string 2 by means such as a clevis 5. The yoke element 4 is a short and generally isosceles triangular shaped plate. The clevis 5 is connected to the obtuse corner of the plate and the conductors 1 are pivotally supported from the acute corners of the plate. The plate 4 is made short so that the distance between the line pole or tower cross-arm and the conductors 1 is as short as possible for a given insulator string length so that the string 2 will have a maximum angle of swing toward the line pole or tower.

The plate 4 retains the conductors 1 in spaced relationship and the conductors are pivoted to the plate 4 by means which comprises a generally narrow and elongated U-shaped connector member 6. The connectors 6 straddle the acute corners of the plate 4 and a pin 7 of the saddle clamps is seated in the bridge portions of connectors 6. The connectors 6 are pivoted at about their central portions to the acute corners of the plate 4 by means such as pins 8. Therefore, the conductors 1 can swing independently of each other.

A channel-shaped member 9 is connected as by welding to the upper ends of the connectors 6. The channel members 9 may have a single bolt 10 permanently connected thereto as by welding so as to minimize the number of loose parts. A pair of generally U-shaped straps 11 of a pair of shields 12 are adapted to be seated in the channel members. The straps 11 have a pair of apertures formed in their bridge portions. Either one of these apertures will register with the bolt 10 and the shields are removably fastened to the connectors 6 by lock nuts or the like. If so desired the bolt 10 or equivalent means such as a stud can be fixed to the straps 11 and the channel members 9 can be apertured for receiving said bolt or stud.

The shields 12 are curved and generally U-shaped. They are positioned along the outer sides of conductors 1 so that their bridge portions 13 are disposed along the saddle clamps 3 whereas their curved ends 14 are disposed adjacent to the lower end of the insulator string 2. Therefore, the shields 12 will serve as voltage grading shields for the insulator string 2 as well as corona shields for the parts such as clamps 3, connectors 6, channels 9, straps 11 and yoke plate 4. The members 12 act as corona shields because they embrace or surround the last mentioned parts such as 3, 6, 9, 11 and 4. The shields 12 can swing with the conductors but the corona shielding and voltage distributing features of the shields 12 are obtained even though the conductors 1 swing considerably since the aforementioned embracing or surrounding relationship is still retained and the curved ends 14 are still adjacent the lower end of the string 2.

In the illustrated form of the invention the shields 12 as well as the connectors 6 with their channels 9 are interchangeable. Additionally, the shields 12 do not interfere with free swinging of the conductors and they are small enough so that they do not seriously decrease the permissible angle of swing of the insulator string 2 toward a line pole or tower structure.

Our invention provides an assembly which is easy to maintain while the maintenance is being done under hot line conditions. That is, the maintenance can be done while the circuits on which these devices are used are energized. Standard procedures and tools are available for doing hot line maintenance work, and our invention provides for the use of these standard procedures and tools.

Extra high voltage conductors are usually located high in the air. Therefore, it is generally necessary for the lineman to work from the line pole or tower structure itself. He does this by reaching out with insulated tools while working from a particular location on the line pole or tower structure.

Therefore, a shield fastening arrangement which was not easily accessible and could not be easily worked with ordinary hot line tools would be unsatisfactory. Also, it is desirable for the lineman to be able to do the hot line work without needing to change locations to reach all the fastening means.

For these reasons the channels 9 and the bolts 10 are arranged to face in the same direction and the bolts 10 and their nuts are arranged on the same side of the plate 4. Accordingly, in our invention the fastening means such as bolts 10 and their nuts can be reached by a lineman with hot line tools from a single location.

In order to facilitate hot line work from a single location and also reduce the number of separate parts only a single bolt 10 and nut is used to mount each shield 12. One bolt and nut is sufficient since the straps 11 are seated in the channels 9. However, the straps 11 are provided with a pair of apertures either of which will register with either of the bolts 10 so that the shields 12 can be interchangeable. This advantage could be accomplished by using a single bolt in the center of the channels 9 and a single aperture in the center of the straps 11. However, if this was done the head or end of the bolts or their nuts might curtail pivotal movement of the connectors 6 by striking the upper sloping edges of the yoke plate 4. Therefore, in our invention we set off the bolts 10 and the apertures in the strap 11 equidistantly from opposite sides of yoke plate 4.

The yoke plate 4 functions as an equalizer between the two cables 1 and their hardware and shields and insulator string 2. Since the plate 4 is pivoted to the insulator string 2 and the clamps 3 are independently pivoted to the plate 4 by connectors 8 relative movement is provided between the conductors 1 themselves and between the conductors 1 and the string 2 in a generally free but still somewhat restricted manner. However, proper shielding during these movements is still provided since the shields 12 are connected to the connectors 6 for movement with the clamps 3.

If the shields 12 did not move with the clamps 3 and connectors 6 but were fixed to the plate 4 there might be moments during their period of swing when they were momentarily outside the protective area of the shields 12. This would result in corona and consequent radio noise. Additionally, if parts such as clamps 3 were not always shielded then they could not be kept relatively small but would have to be made larger with gradually curved and smoothed surfaces and edges so that they would not emit corona. Additionally, since the shields 12 can move with the clamps 3 and connectors 6 and thereby always shield these parts the shields 12 do not have to be as large as they would need to be if they were immovable.

While there has been shown and described a particular embodiment of the invention, it will be obvious to those skilled in the art that changes and modifications may be made without departing from the invention, and therefore, it is intended by the appended claims to cover all such changes and modifications as fall within the true spirit and scope of the invention.

What we claim as new and desire to secure by Letters Patent of the United States is:

1. In a high voltage electrical transmission line installation which comprises a pair of spaced and generally parallel electrical conductors which are supported by an electrical insulator string, a yoke member which is pivotally connected to an end of said insulator string, a pair of conductor clamps which are clamped to said conductors, a pair of connectors independently pivotally connecting said clamps to said yoke member, and a pair of shields a different one of said shields being removably connected to each of said connectors, each of said shields being generally U-shaped and having rounded bridge portions and curved open ends and having their bridge portions disposed along the outer sides of said clamps and their curved ends disposed adjacent said insulator string end.

2. In a high voltage electrical transmission line installation which comprises a pair of spaced and generally parallel electrical conductors, a pair of conductor clamps for said conductors, a yoke member, a pair of connectors independently pivotally connecting said clamps to opposite ends of said yoke member, a shield for each of said conductors, clamps and connectors, said shields being removably fastened to said connectors whereby they are free for movement with said conductors, clamps and connectors, the fastening means for removably fastening both of said shields to said connectors being accessible from adjacent the same end and side of said yoke member.

3. In a high voltage electrical transmission line installation which comprises a pair of spaced and generally parallel electrical conductors, a pair of conductor clamps for said conductors, a yoke member, a pair of connectors independently pivotally connecting said clamps to opposite ends of said yoke member, and a shield for each of said conductors, clamps and connectors, said connectors having channel shaped members connected thereto which face in the same direction, said shields having straps connected thereto which are seated in said channel shaped members and removably fastened thereto, said straps being removably fastened to said channel shaped members by fastening means which are accessible from adjacent the same end and side of said yoke member.

4. In a high voltage electrical transmission line installation which comprises a pair of spaced and generally parallel electrical conductors which are independently pivotally supported from opposite ends of a yoke member by a pair of connectors, a pair of shields which are connected to said connectors for movement with said conductors and connectors, said shields comprising generally U-shaped members which are rounded at their bridge portions and curved at their ends in the same direction away from the main plane of said shields, said bridge portions being positioned adjacent opposite ends of said yoke member with their rounded bridge portions being disposed along the outer sides of said conductors, and the curved ends of said shields extending generally over said conductors and their connectors.

References Cited in the file of this patent

UNITED STATES PATENTS 2,741,321      McCoy et al. _____ Apr. 10, 1956

FOREIGN PATENTS 170,222      Austria _____ Jan. 25, 1952

OTHER REFERENCES

Publication: "Doubles 115-kv. Line Conductoring," Electrical World, March 25, 1957, page 98. Copy in Patent Office Library.